(12) United States Patent
Yoon et al.

(10) Patent No.: US 6,992,837 B2
(45) Date of Patent: Jan. 31, 2006

(54) HYBRID LENS AND PROJECTION OPTICAL SYSTEM INCLUDING THE SAME

(75) Inventors: Seok-il Yoon, Daejeon Metropolitan (KR); Gyu-hwan Hwang, Hwaseong-gun (KR); Alexandr F. Shirankov, Pushkino (RU); Oleg V. Rozhkov, Moscow (RU); Vadim V. Pozdnyakov, Fryazino (RU); Alexey M. Khorokhorov, Moscow (RU)

(73) Assignee: Samsung Electronics Co., Ltd., Kyungki-do (KR)

( * ) Notice: Subject to any disclaimer, the term of this patent is extended or adjusted under 35 U.S.C. 154(b) by 173 days.

(21) Appl. No.: 10/664,043

(22) Filed: Sep. 17, 2003

(65) Prior Publication Data

US 2004/0114057 A1    Jun. 17, 2004

(30) Foreign Application Priority Data

Sep. 17, 2002    (RU) .............................. 2002124710

(51) Int. Cl.
*G02B 3/02*      (2006.01)
*G02B 13/18*     (2006.01)

(52) U.S. Cl. ...................... 359/708; 359/718; 359/719

(58) Field of Classification Search ................ 359/649, 359/650, 651, 648, 753, 782, 784, 713–718, 359/708; 348/776, 778, 779, 781
See application file for complete search history.

(56) References Cited

U.S. PATENT DOCUMENTS

| 4,924,244 | A |   | 5/1990  | Kataoka et al. ............. 359/649 |
| 5,016,994 | A | * | 5/1991  | Braat ......................... 359/708 |
| 5,272,540 | A |   | 12/1993 | Hirata et al. ................ 348/781 |
| 5,309,283 | A |   | 5/1994  | Kreitzer ..................... 359/649 |
| 5,572,277 | A | * | 11/1996 | Uzawa et al. ............... 359/686 |

FOREIGN PATENT DOCUMENTS

| CN | 2280923 Y     | 5/1998 |
| JP | 2002-107674 A | 4/2002 |
| WO | WO 98/34134 A1 | 8/1998 |

* cited by examiner

*Primary Examiner*—Timothy Thompson
(74) *Attorney, Agent, or Firm*—Sughrue Mion, PLLC

(57) ABSTRACT

A hybrid lens and a projection optical system having the hybrid lens are provided. The projection optical system includes a hybrid lens that is positioned along an optical path between a fluorescent surface and a screen onto which light emitted from the fluorescent surface is projected to form an image. The hybrid lens includes a spherical lens and an aspherical lens formed of plastic on at least one surface of the spherical lens. Accordingly, aberration can be corrected to improve image quality.

16 Claims, 9 Drawing Sheets

FIG. 6

| No. | RADIUS | THICKNESS (DISTANCE) | REFRACTIVE INDEX | NUMERICAL APERTURE |
|---|---|---|---|---|
| OBJECT SURFACE | | 922.975 | Air | 1397.09 |
| 1* | 60.05069 | 1.5 | 1.493805 | 83.89 |
| 2 | 90.00000 | 7.5 | 1.489147 | 81.17 |
| 3 | 90.00000 | 1.5 | 1.493805 | 75.47 |
| 4* | 66.90956 | 16.4322 | Air | 74.80 |
| 5 | ∞ | 7 | Air | 66.00 |
| 6 | 61.9601 | 20 | 1.609731 | 68.27 |
| 7 | -189.2238 | 7 | Air | 65.51 |
| 8 | ∞ | 14.1303 | Air | 56 |
| 9* | -362.7472 | 7.3 | 1.493805 | 60.71 |
| 10* | -78.2302 | 21 | Air | 63.37 |
| 11* | -35.7100 | 4 | 1.493805 | 68.21 |
| 12 | -44.0000 | 9 | 1.439243 | 72.69 |
| 13 | ∞ | 14.1 | 1.565745 | 106.93 |
| FLUORESCENT SURFACE | -350 | | | 116.92 |

FIG. 7

| No. | 2rd | 3rd | 4th | 5th | 6th | 7th |
|---|---|---|---|---|---|---|
| 1* | -1.8316301E-6 | -3.5473076E-10 | -9.2394093E-13 | 6.8707316E-16 | -1.3408518E-19 | 4.107423328E-25 |
| 4* | -1.34090016E-6 | -2.4937633E-10 | -9.5364364E-13 | 9.945294E-16 | -2.5812749E-19 | 1.31567248E-23 |
| 9* | -2.9172356E-6 | -4.2911832E-9 | 1.1246133E-11 | -2.2945273E-14 | 2.6691291E-17 | -1.1233961E-20 |
| 10* | 6.526353E-7 | -1.1484778E-8 | 3.1028913E-11 | -4.8636258E-14 | 4.3125163E-17 | -1.5063977E-20 |
| 11* | -7.4071162E-7 | 1.626278E-8 | -3.9016282E-11 | 5.3997755E-11 | -3.7150354E-17 | 1.0494621E-20 |

HYBRID LENS AND PROJECTION OPTICAL SYSTEM INCLUDING THE SAME

This application claims the priority of Russian Patent Application No. 2002-124710, filed on Sep. 17, 2002, in the Russian Patent Office, the disclosure of which is incorporated herein in its entirety by reference.

BACKGROUND OF THE INVENTION

1. Field of the Invention

The present invention relates to a hybrid lens and a projection optical system using the same, and more particularly, to a hybrid lens capable of realizing a high resolution and a projection optical system using the same.

2. Description of the Related Art

Focusing performance is very important in a projection TV optical system, which projects an original image formed on a fluorescent face of a Braun tube (CRT; Cathode Ray Tube) onto a screen. For focusing, a projection optical system uses an aspherical plastic lens capable of compensating for aberration. However, the refractive index, shape, and focal length of the aspherical plastic lens vary with changes in temperature, which degrades the focusing performance. In order to solve these problems, in the prior art, including WO 98-34134, U.S. Pat. Nos. 5,272,540, and 4,924,244, a projection optical system using a technique for combining a single lens, a double glass lens, and an aspherical lens is proposed.

FIG. 1 is a cross-sectional view of a projection optical system disclosed in U.S. Pat. No. 5,272,540. Here, reference numerals 11, 12, 13, 14, and 15 denote first, second, third, fourth, and fifth group lenses, respectively. Here, the third group lens 13 is composed of a pair of glass lenses 13a and 13b. Reference numeral 16 denotes a cooling liquid, reference numeral 17 denotes a protective lens that covers a fluorescent surface $P_1$ of a CRT, and reference numeral 19 denotes a screen. Referring to FIG. 1, RAY1 denotes an upper limit and RAY2 denotes a lower limit of light rays emitted from a center point A of the fluorescent surface $P_1$ of the CRT. RAY3 denotes an upper limit and RAY4 denotes a lower limit of light rays emitted from an object point B in the periphery of an image plane.

The first and second group lenses 11 and 12 are aspherical plastic lenses positioned on an optical axis to provide weak, positive refractive index. In order to reduce the dependence of the focus drift on temperature, the first group lens 11 is made concave and disposed adjacent to the screen 19, the second group lens 12 is made convex and disposed behind the first group lens 11, and the refractive indexes of the first and second group lenses 11 and 12 are substantially the same. The third group lens 13 is formed by bonding a pair of glass lenses and is disposed immediately behind the second group lens 12.

However, it is costly to manufacture groups of lenses constituting the projection optical system disclosed in the prior art, including U.S. Pat. No. 5,272,540, and image quality is degraded.

FIG. 2 is a graph of a modulation transfer function (MTF) versus a spatial frequency in cycles per millimeter when a general aspherical lens is used. Here, the MTF is defined by Equation 1 in terms of the maximum intensity Max and the minimum intensity Min of light. When the MTF is 1, resolution is optimal. Resolution decreases with a reduction in the MTF.

$$MTF = \frac{Max - Min}{Max + Min} \quad (1)$$

Referring to FIG. 2, f0 represents a case when an image height h (which refers to a distance from a point "O" where the optical axis meets an image plane to an image) is zero, f1 represents a case when the image height h is 20 mm, f2 represents a case when the image height h is 40 mm, f2 represents a case when the image height h is 60 mm, and f4 represents a case the image height h is 63.50 mm. Regardless of the variation in the spatial frequency, the MTF is the highest when the image height h is zero (f0) and the lowest when the image height h is 40 mm (f2). However, as can be seen from f0, f1, f2, f3, and f4, the MTF sharply decreases with an increase in the spatial frequency. As the MTF decreases, the contrast of an image formed by the projection optical system is reduced.

FIGS. 3A through 3C respectively illustrate the emission spectrums of a CRT emitting green, blue, and red light. Referring to FIG. 3A, the emission intensity of green light has a primary peak at a wavelength of 550 nm, a secondary peak at a wavelength of 490 nm, and is weak at other wavelengths. Referring to FIG. 3B, the emission intensity of blue light peaks at a wavelength of 450 nm and falls off within a wavelength range of 400 nm–500 nm. Referring to FIG. 3C, the emission intensity of red light peaks at a wavelength of 620 nm. Since the emission spectra of blue and red light overlap around the central wavelength of green light, the wavelengths of blue and red light, except the central wavelength of green light, are emitted in different wavelength bands, which results in chromatic aberration. Thus, an optical system capable of reducing the chromatic aberration is required.

SUMMARY OF THE INVENTION

The present invention provides a hybrid lens capable of correcting chromatic aberration and a projection optical system using the hybrid lens.

According to an exemplary aspect of the present invention, there is provided a hybrid lens including a spherical lens and an aspherical lens formed of plastic on at least one surface of the spherical lens.

The aspherical lens may be formed on an incidence surface and an emission surface of the spherical lens.

The spherical lens may be formed of glass and preferably, but not necessarily, has a refractive index within a range of 1.45–1.95.

It is preferable, but not necessary, that the aspherical lens has a refractive index, which is different from the refractive index of the spherical lens, within a range of 1.45–1.8.

Here, when c is a surface curvature (an inverse function of radius), ρ is a position on an optical surface in radial coordinates, k is a conic constant, and $\alpha_i$ is a polynominal coefficient defining the deviation from a spherical surface, a lens surface z of the aspherical lens satisfies Equation 2:

$$z = \frac{c \cdot \rho^2}{1 + \sqrt{1 - (1+k) \cdot c^2 \cdot \rho^2}} + \sum_{i=2}^{7} a_i^{2i} \quad (2)$$

According to another exemplary aspect of the present invention, there is provided a projection optical system including a hybrid lens that is positioned along an optical path between a fluorescent surface and a screen onto which light emitted from the fluorescent surface is projected to form an image and includes a spherical lens and an aspherical lens formed of plastic on at least one surface of the spherical lens.

The aspherical lens may be formed on an incidence surface and an emission surface of the spherical lens.

The spherical lens may be formed of glass, and preferably, but not necessarily, has a refractive index within a range of 1.45–1.95.

It is preferable, but not necessary, that the aspherical lens has a refractive index, which is different from the refractive index of the spherical lens, within a range of 1.45–1.8.

When c is a surface curvature (an inverse function of radius), ρ is a position on an optical surface in radial coordinates, k is a conic constant, and $α_i$ is a polynominal coefficient defining the deviation from a spherical surface, a lens surface z of the aspherical lens satisfies Equation 2 above.

The projection optical system may further include a protective lens that covers the entire fluorescent surface.

The projection optical system may further include a meniscus lens that is positioned along an optical path between the protective lens and the hybrid lens. It is preferable, but not necessary, that the projection optical system includes a cooling liquid that is positioned between the protective lens and the meniscus lens.

It is preferable, but not necessary, that the hybrid lens is a correction power lens.

The projection optical system may further include at least one correction power lens that is positioned between the hybrid lens and the fluorescent surface. The correction power lens has an aspherical surface.

BRIEF DESCRIPTION OF THE DRAWINGS

The above and other features and advantages of the present invention will become more apparent by describing in detail exemplary embodiments thereof with reference to the attached drawings in which:

FIG. 6 is a table of the radii, thicknesses, refractive indexes, and numerical apertures of lenses used in the projection optical system shown in FIG. 5;

FIG. 7 is a table of aspherical coefficients used in the projection optical system shown in FIG. 5.

DETAILED DESCRIPTION OF THE INVENTION

Figure 1:
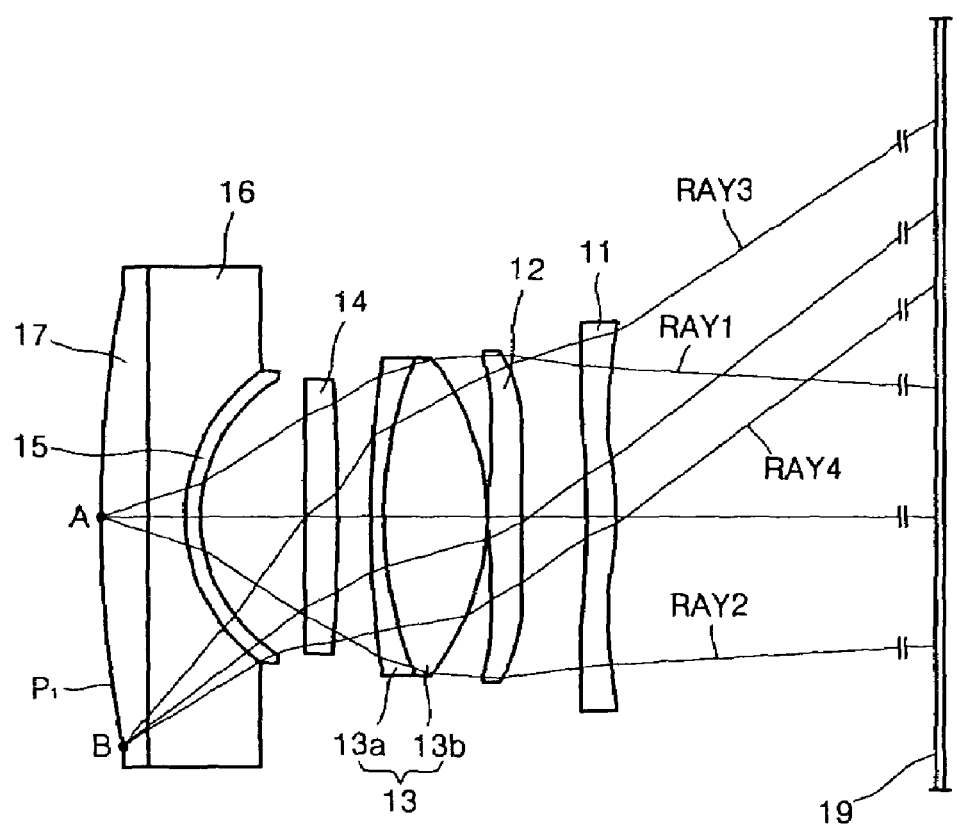
FIG. 1 is a cross-sectional view of a projection optical system disclosed in U.S. Pat. No. 5,272,540.

Hereinafter, an aspherical hybrid lens according to illustrative, non-limiting embodiments of the present invention and a projection optical system using the same will be described in detail with reference to the attached drawings. In the drawings, the thicknesses and sizes of lenses are exaggerated for clarity. Also, spherical and aspherical shapes of the lenses are taken as examples and are not intended to limit the scope of the invention.

Figure 4A:
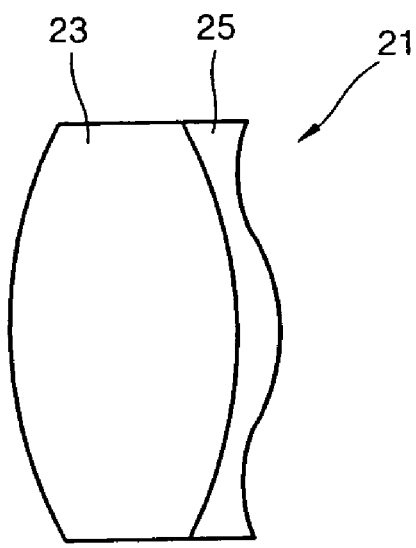
FIG. 4A is a schematic cross-sectional view of an aspherical hybrid lens according to an exemplary embodiment of the present invention.

FIG. 4A is a schematic cross-sectional view of an aspherical hybrid lens according to an exemplary embodiment of the present invention. Referring to FIG. 4A, an aspherical hybrid lens 21 includes a spherical lens 23 and an aspherical lens 25 which is formed on one of an emission surface and an incidence surface of the spherical lens 23. A ratio of the occupied area of the aspherical lens 25 to the gross area depends on the area of illuminating incident light.

The spherical lens 23 is formed of glass and its refractive index is constant throughout. It is preferable, but not necessary, that the refractive index of the glass is within a range of 1.45–1.95. The aspherical lens 25 is formed of plastic having a refractive index that is constant throughout the lens and preferably different from the refractive index of the glass spherical lens 22. It is preferable, but not necessary, that the refractive index of the plastic is within a range of 1.45–1.8.

Figure 4B:
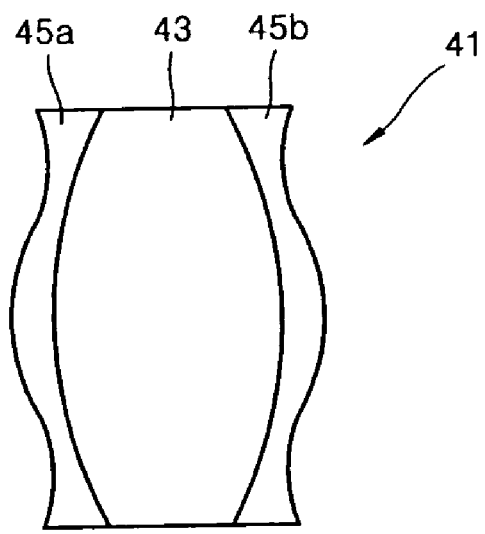
FIG. 4B is a schematic cross-sectional view of a hybrid lens according to another exemplary embodiment of the present invention.

FIG. 4B is a schematic cross-sectional view of a hybrid lens according to another exemplary embodiment of the present invention. Referring to FIG. 4B, a hybrid lens 41 includes a spherical lens 43 and first and second aspherical lenses 45a and 45b which are respectively formed on an incidence surface and an emission surface of the spherical lens 43.

Like the spherical lens 23 shown in FIG. 4A, the spherical lens 43 is formed of glass and has a similar refractive index to the spherical lens 23. The first and second aspherical lenses 45a and 45b may be formed as a single lens on the surface of the spherical lens 43 or may be separately formed on the incidence surface and the emission surface of the spherical lens 43. The refractive indexes of the first and second aspherical lenses 45a and 45b are similar to the refractive index of the aspherical lens 25 shown in FIG. 4A.

Refraction angles of a spherical lens and an aspherical lens vary with wavelength, which results in chromatic aberration. As the wavelength of light passing through the spherical lens increases, the focal length of the spherical lens decreases. Thus, focal length is shortest for red light and longest for blue light. In contrast, as the wavelength of light passing through the aspherical lens increases, the focal length of the aspherical lens increases. Thus, focal length is shortest for blue light and longest for red light. A hybrid lens according to the present invention is formed by combining a spherical lens and an aspherical lens so that the chromatic aberration of the two lenses compensate for each other. Thus, the hybrid lens has no chromatic aberration. Here, the refractive indexes and curvatures of the spherical lens and the aspherical lens must be adjusted appropriately to completely remove chromatic aberration in the hybrid lens. In particular, forming the spherical lens of glass and the aspherical lens of plastic is effective in removing chromatic aberration.

Figure 5:
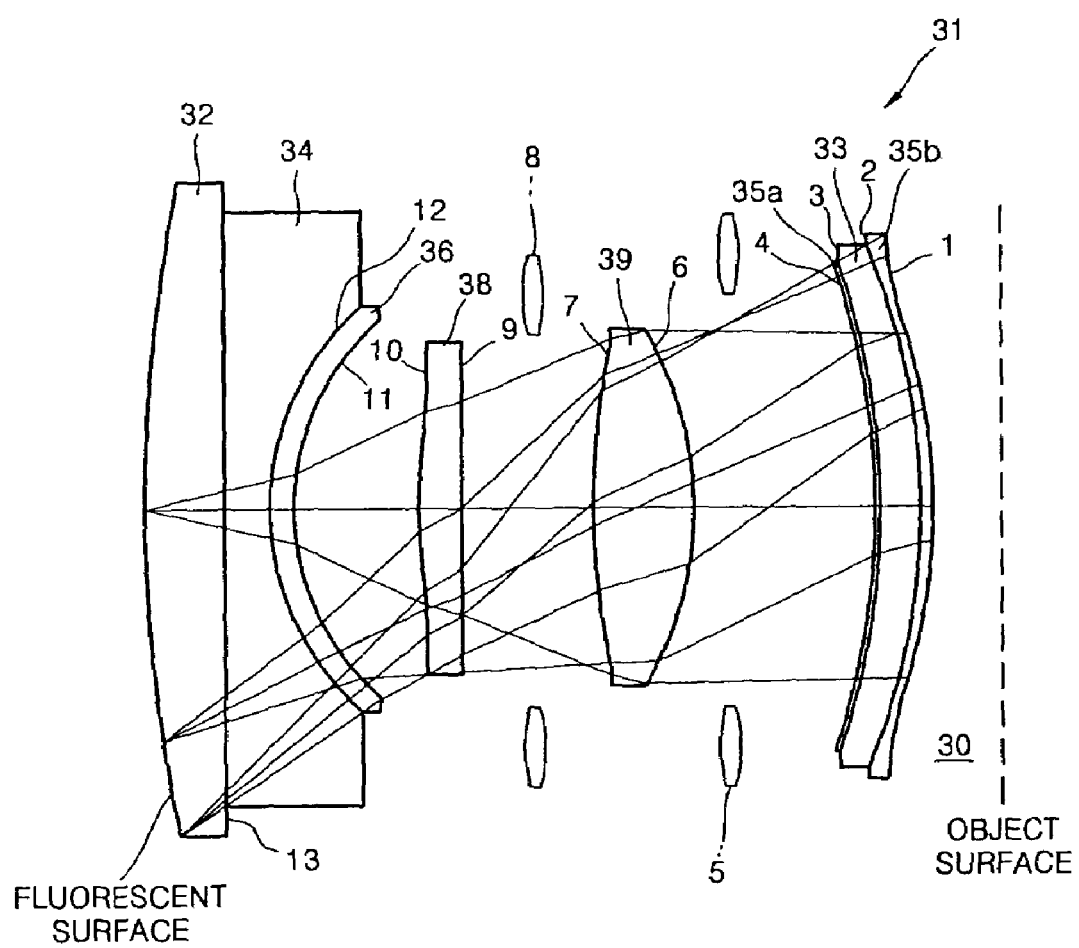
FIG. 5 is a schematic cross-sectional view of a projection optical system according to an exemplary embodiment of the present invention.

FIG. 5 is a schematic cross-sectional view of a projection optical system using the aspherical hybrid lens shown in FIG. 4A, according to an exemplary embodiment of the present invention. Referring to FIG. 5, in a projection optical system 30, a protective lens 32, a meniscus lens 36, first and second power lenses 38 and 39, and a hybrid lens 31 are sequentially arranged along the same optical axis. A cooling liquid 34 is prepared between the protective lens 32 and the meniscus lens 36. Hybrid lens 31 includes first and second aspherical lenses 35a and 35b which are formed on the surfaces of a spherical lens 33. Here, the first and second aspherical lenses 35a and 35b can have different refractive indexes and dispersions from the spherical lens 33 so as to correct aberration and have constant focusing power.

In the projection optical system 30, the hybrid lens 31 is positioned adjacent to an object surface. However, the meniscus lens 36 or the first and second power lenses 38 and 39 can be replaced with the hybrid lens 31 to reduce chromatic aberration. It is preferable, but not necessary, that the hybrid lens 31, and the first and second power lenses 38 and 39 are correction power lenses. The first and second power lenses 38 and 39 have aspherical surfaces so as to effectively compensate for chromatic aberration.

The functions of the lenses, except the hybrid lens 31, and optical paths of light passing through the lenses will now be explained.

The protective lens 32 covers a fluorescent surface of a CRT and allows red, green, or blue light emitted from the fluorescent surface of the CRT to proceed toward the inside of the projection optical system 30. Light that has passed through the protective lens 32 is refracted by the meniscus lens 36 and diverges after passing through the cooling liquid 34.

The meniscus lens 36 is a single lens element, both surfaces of which curve in the same direction. A convex meniscus lens has a central portion that is thicker than an outer portion. A concave meniscus lens has a central portion that is thinner than an outer portion. The light that has diverged after passing through the meniscus lens 36 is refracted by the first and second power lenses 38 and 39 and then focused onto the hybrid lens 31. In this optical system, the light emitted from the bottom portion of the protective lens 32 proceeds toward the top portion of the hybrid lens 31.

The first and second aspherical lenses 35a and 35b of the hybrid lens 31 can have different refractive indexes from the spherical lens 33 so as to serve as power lenses. Since a projection TV uses a monochromatic CRT, RGB color signals are produced by fluorescent surfaces of red, green, and blue CRTs and combined by the projection optical system 30 to form an image. Here, green light greatly affects image quality. Thus, the present invention proposes an aspherical hybrid lens formed by combining an aspherical lens and a spherical lens having different optical characteristics such as different refractive indexes and dispersions so as to correct aberration of each color of light including green light.

The table of FIG. 6 shows design values of lenses used in the projection optical system according to the present invention, i.e., radii, thicknesses, refractive indexes, and numerical apertures. Referring to FIG. 6, reference numerals 1, 4, 9, 10, and 11 denote aspherical lens surfaces, reference numerals 2, 3, 6, 7, and 12 denote spherical lens surfaces, and reference numerals 5 and 8 denote aperture stop for removing unnecessary light. Equation 2 described above is the basic equation for designing the aspherical surfaces 1, 4, 9, 10, and 11. In Equation 2, c is a surface curvature (an inverse function of a radius), $\rho$ is a position on an optical surface in radial coordinates, k is a conic constant (k=0 in the current optical design), and $\alpha_i$ is a coefficient of a polynominal expression defining deviation from a spherical surface.

Figure 8:
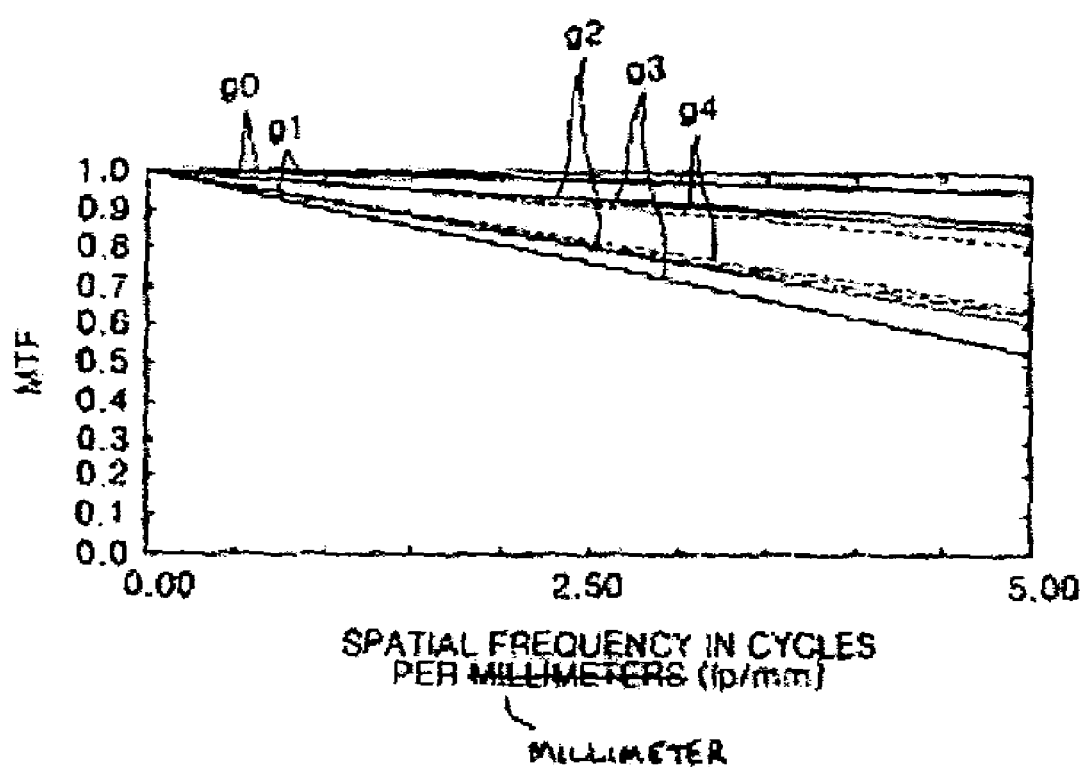
FIG. 8 is a graph of the MTF of the projection optical system of FIG. 5 versus a spatial frequency in cycles per millimeter.

The table of FIG. 7 shows the polynominal coefficient $\alpha_i$ (i=2–7) of the aspherical surfaces 1, 4, 9, 10, and 11. FIG. 8 illustrates the MTF measured by using lenses having the aspherical surfaces 1, 4, 9, 10, and 11 manufactured according to the set design values in the projection optical system shown in FIG. 5.

Figure 2:
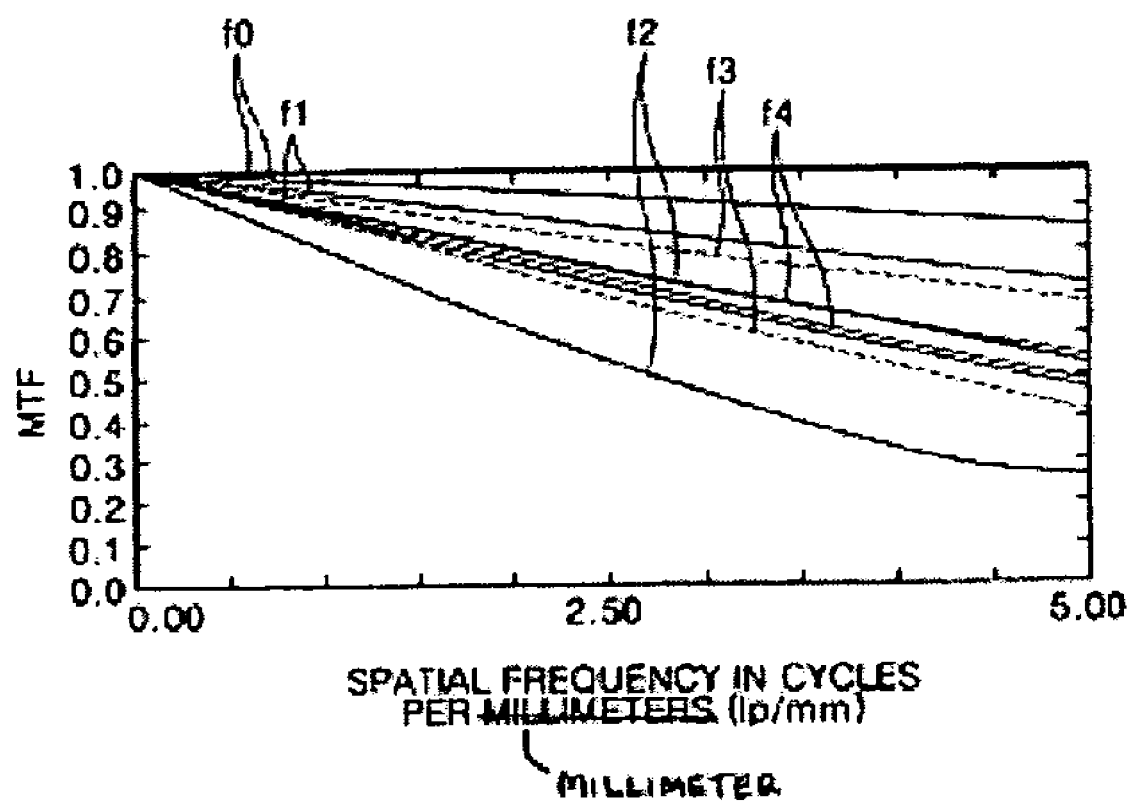
FIG. 2 is a graph of a modulation transfer function (MTF) versus a spatial frequency in cycles per millimeter when a general aspherical plastic lens is used.
Figure 3A:
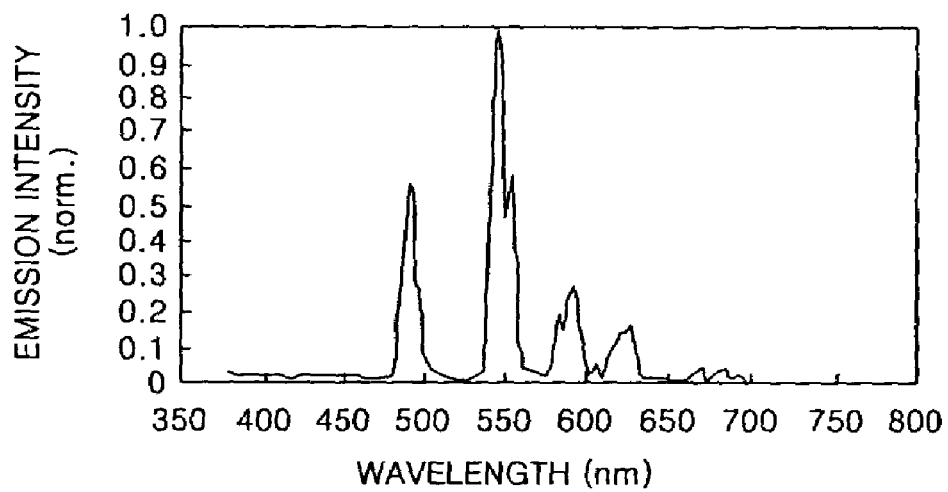
FIGS. 3A through 3C respectively illustrate the emission spectrums of a CRT emitting green, blue, and red light.
Figure 3B:
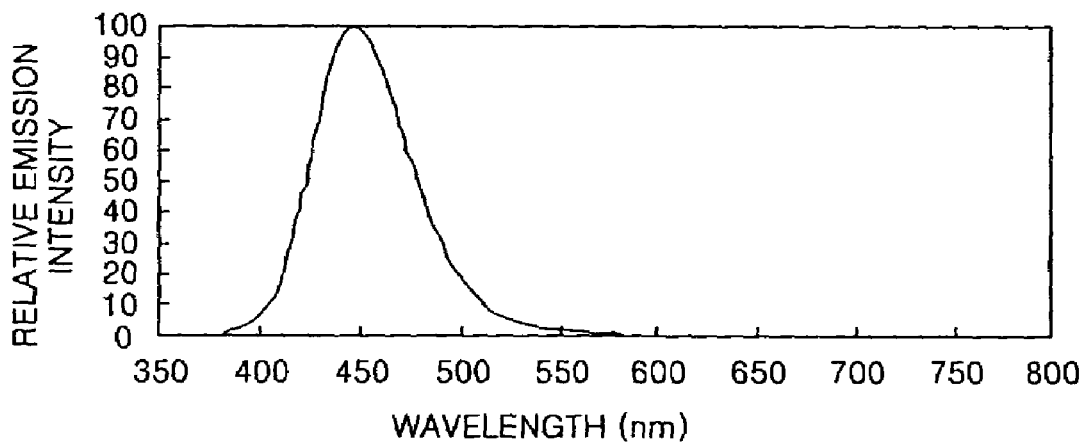
Figure 3C:
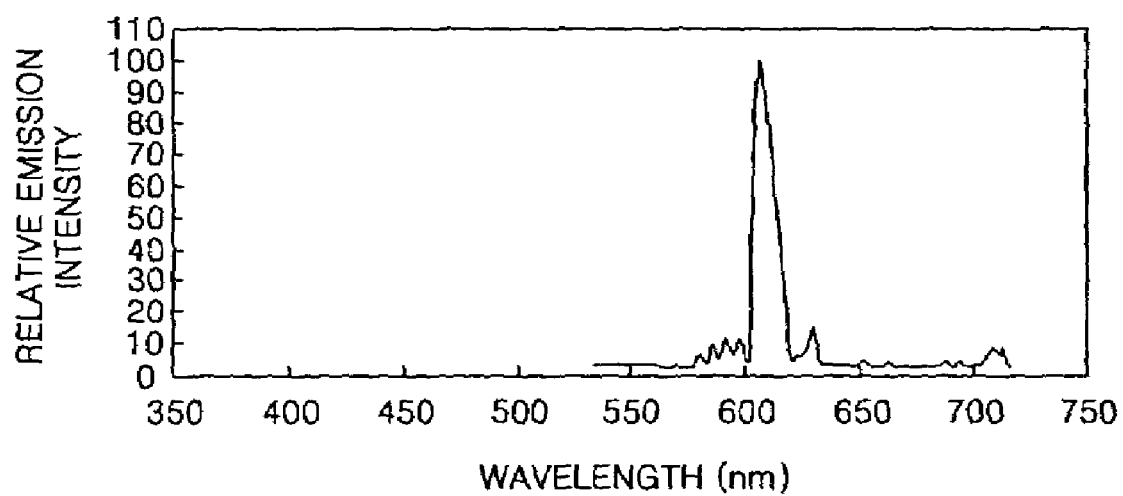

FIG. 8 is a graph of the MTF of the projection optical system of the present invention versus a spatial frequency in cycles per millimeter. Here, g0 represents an image height of zero, g1 represents an image height of 20 mm, g2 represents an image height of 40 mm, g3 represents an image height of 60 mm, and g4 represents an image height of 63.50 mm. As can be seen in FIG. 8, the MTF of the projection optical system of the present invention increases in each field compared to that of the projection optical system shown in FIG. 2, and is above 0.5 at a spatial frequency of about 5 Hz. Accordingly, the projection optical system according to the present invention can realize higher contrast and resolution than a projection optical system according to the prior art.

As described above, in the present invention, a hybrid lens, in which an aspherical lens is formed of plastic on the surface of a spherical lens formed of glass, is disposed in a projection optical system. Thus, chromatic aberration can be reduced so as to provide an image having high contrast and resolution.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, the scope of the present invention must be determined by the appended claims, not by the above exemplary embodiments.

What is claimed is:

1. A hybrid lens comprising:
   a spherical lens; and
   an aspherical lens formed of plastic on at least one surface of the spherical lens;
   wherein when c is a surface curvature (an inverse function of radius), $\rho$ is a position on an optical surface in radial coordinates, k is a conic constant, and $\alpha_i$ is a polynominal coefficient defining the deviation from a spherical surface, a lens surface z of the aspherical lens satisfies the equation:

$$z = \frac{c \cdot \rho^2}{1 + \sqrt{1 - (1+k) \cdot c^2 \cdot \rho^2}} + \sum_{i=2}^{7} a_i^{2i}.$$

2. The hybrid lens of claim 1, wherein the aspherical lens is formed on at least one of an incidence surface and an emission surface of the spherical lens.

3. The hybrid lens of claim 1, wherein the spherical lens is formed of glass.

4. The hybrid lens of claim 1, wherein the spherical lens has a refractive index within a range of 1.45–1.95.

5. The hybrid lens of claim 1, wherein the aspherical lens has a refractive index within a range of 1.45–1.8.

6. The hybrid lens of claim 1, wherein the spherical lens and the aspherical lens have different refractive indexes.

7. A projection optical system comprising:
   a hybrid lens that is positioned along an optical path between a fluorescent surface and a screen onto which light emitted from the fluorescent surface is projected to form an image and includes a spherical lens and an aspherical lens formed of plastic on at least one surface of the spherical lens;

a protective lens that covers the entire fluorescent surface;

a meniscus lens that is positioned along an optical path between the protective lens and the hybrid lens; and a cooling liquid that is positioned between the protective lens and the meniscus lens.

8. The projection optical system of claim 7, wherein the aspherical lens is formed on at least one of an incidence surface and an emission surface of the spherical lens.

9. The projection optical system of claim 7, wherein the spherical lens is formed of glass.

10. The projection optical system of claim 7, wherein the spherical lens has a refractive index within a range of 1.45–1.95.

11. The projection optical system of claim 7, wherein the aspherical lens has a refractive index within a range of 1.45–1.8.

12. The projection optical system of claim 7, wherein the spherical lens and the aspherical lens have different refractive indexes.

13. A projection optical system comprising a hybrid lens that is positioned along an optical path between a fluorescent surface and a screen onto which light emitted from the fluorescent surface is projected to form an image and includes a spherical lens and an aspherical lens formed of plastic on at least one surface of the spherical lens;

wherein when c is a surface curvature (an inverse function of radius), $\rho$ is a position on an optical surface in radial coordinates, k is a conic constant, and $\alpha_i$ is a polynominal coefficient defining the deviation from a spherical surface, a lens surface z of the aspherical lens satisfies the equation:

$$z = \frac{c \cdot \rho^2}{1 + \sqrt{1 - (1+k) \cdot c^2 \cdot \rho^2}} + \sum_{i=2}^{7} a_i^{2i}.$$

14. The projection optical system of claim 7, wherein the hybrid lens is a correction power lens.

15. The projection optical system of claim 7, further comprising at least one correction power lens that is positioned between the hybrid lens and the fluorescent surface, and refracts incident light.

16. The projection optical system of claim 15, wherein the correction power lens has an aspherical surface.

* * * * *